US011496942B2

(12) United States Patent
Kumar

(10) Patent No.: US 11,496,942 B2
(45) Date of Patent: Nov. 8, 2022

(54) PERFORMING A HANDOVER BASED AT LEAST IN PART ON A PREDICTED USER EQUIPMENT MOBILITY

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/180,336

(22) Filed: Feb. 19, 2021

(65) Prior Publication Data

US 2022/0272597 A1    Aug. 25, 2022

(51) Int. Cl.
*H04W 36/30* (2009.01)
*H04W 28/26* (2009.01)
*H04W 36/32* (2009.01)
*H04W 36/00* (2009.01)
*H04W 36/24* (2009.01)

(52) U.S. Cl.
CPC ........... *H04W 36/32* (2013.01); *H04W 28/26* (2013.01); *H04W 36/0058* (2018.08); *H04W 36/00837* (2018.08); *H04W 36/245* (2013.01)

(58) Field of Classification Search
CPC . H04W 36/32; H04W 28/26; H04W 36/0058; H04W 36/00837; H04W 36/245
USPC .................................................. 370/380, 331
See application file for complete search history.

(56) References Cited

U.S. PATENT DOCUMENTS

| 2014/0293858 | A1* | 10/2014 | Kalhan | H04W 36/0072 370/311 |
| 2015/0038150 | A1* | 2/2015 | Wang | H04W 36/0061 455/438 |
| 2015/0038156 | A1* | 2/2015 | Kilpatrick, II | H04W 52/50 455/561 |
| 2015/0038180 | A1* | 2/2015 | Quick, Jr. | H04W 36/32 455/458 |
| 2015/0099953 | A1* | 4/2015 | Baker, Jr. | A61B 5/14552 600/324 |
| 2015/0358903 | A1* | 12/2015 | Onaka | H04W 36/0011 370/252 |
| 2019/0364492 | A1* | 11/2019 | Azizi | H04W 68/005 |
| 2021/0051524 | A1* | 2/2021 | Jung | H04W 76/25 |
| 2021/0314827 | A1* | 10/2021 | Yang | H04W 36/0072 |
| 2022/0201790 | A1* | 6/2022 | Jung | H04W 48/08 |
| 2022/0279613 | A1* | 9/2022 | Cheng | H04W 76/19 |

* cited by examiner

*Primary Examiner* — Gregory B Sefcheck
*Assistant Examiner* — Majid Esmaeilian
(74) *Attorney, Agent, or Firm* — Harrity & Harrity, LLP

(57) ABSTRACT

Various aspects of the present disclosure generally relate to wireless communication. In some aspects, a user equipment (UE) may determine predicted mobility information associated with the UE that indicates a predicted route of the UE and one or more cells associated with the predicted route. The UE may transmit the predicted mobility information to a source base station. The UE may perform a handover of the UE from the source base station to a target base station based at least in part on the predicted mobility information. Numerous other aspects are described.

30 Claims, 10 Drawing Sheets

PERFORMING A HANDOVER BASED AT LEAST IN PART ON A PREDICTED USER EQUIPMENT MOBILITY

FIELD OF THE DISCLOSURE

Aspects of the present disclosure generally relate to wireless communication and to techniques and apparatuses for performing a handover based at least in part on a predicted user equipment (UE) mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes determining predicted mobility information associated with the UE that indicates a predicted route of the UE and one or more cells associated with the predicted route; transmitting the predicted mobility information to a source base station; and performing a handover of the UE from the source base station to a target base station based at least in part on the predicted mobility information.

In some aspects, a method of wireless communication performed by a source base station includes receiving, from a UE, predicted mobility information that indicates a predicted route of the UE and one or more cells associated with the predicted route, wherein the predicted mobility information indicates a confidence level for each of the one or more cells associated with the predicted route; and enabling a handover of the UE from the source base station to a target base station based at least in part on the predicted mobility information.

In some aspects, a UE for wireless communication includes a memory and one or more processors operatively coupled to the memory, the memory and the one or more processors configured to: determine predicted mobility information associated with the UE that indicates a predicted route of the UE and one or more cells associated with the predicted route; transmit the predicted mobility information to a source base station; and perform a handover of the UE from the source base station to a target base station based at least in part on the predicted mobility information.

In some aspects, a source base station for wireless communication includes a memory and one or more processors operatively coupled to the memory, the memory and the one or more processors configured to: receive, from a UE, predicted mobility information that indicates a predicted route of the UE and one or more cells associated with the predicted route, wherein the predicted mobility information indicates a confidence level for each of the one or more cells associated with the predicted route; and enable a handover of the UE from the source base station to a target base station based at least in part on the predicted mobility information.

In some aspects, a non-transitory computer-readable medium storing a set of instructions for wireless communication includes one or more instructions that, when executed by one or more processors of a UE, cause the UE to: determine predicted mobility information associated with the UE that indicates a predicted route of the UE and one or more cells associated with the predicted route; transmit the predicted mobility information to a source base station; and perform a handover of the UE from the source base station to a target base station based at least in part on the predicted mobility information.

In some aspects, a non-transitory computer-readable medium storing a set of instructions for wireless communication includes one or more instructions that, when executed by one or more processors of a source base station, cause the source base station to: receive, from a UE, predicted mobility information that indicates a predicted route of the UE and one or more cells associated with the predicted route, wherein the predicted mobility information indicates a confidence level for each of the one or more cells associated with the predicted route; and enable a handover of the UE from the source base station to a target base station based at least in part on the predicted mobility information.

In some aspects, an apparatus for wireless communication includes means for determining predicted mobility information associated with the apparatus that indicates a predicted route of the apparatus and one or more cells associated with the predicted route; means for transmitting the predicted mobility information to a source base station; and means for performing a handover of the apparatus from the source base station to a target base station based at least in part on the predicted mobility information.

In some aspects, an apparatus for wireless communication includes means for receiving, from a UE, predicted mobility information that indicates a predicted route of the UE and one or more cells associated with the predicted route, wherein the predicted mobility information indicates a confidence level for each of the one or more cells associated with the predicted route; and means for enabling a handover of the UE from the apparatus to a target base station based at least in part on the predicted mobility information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
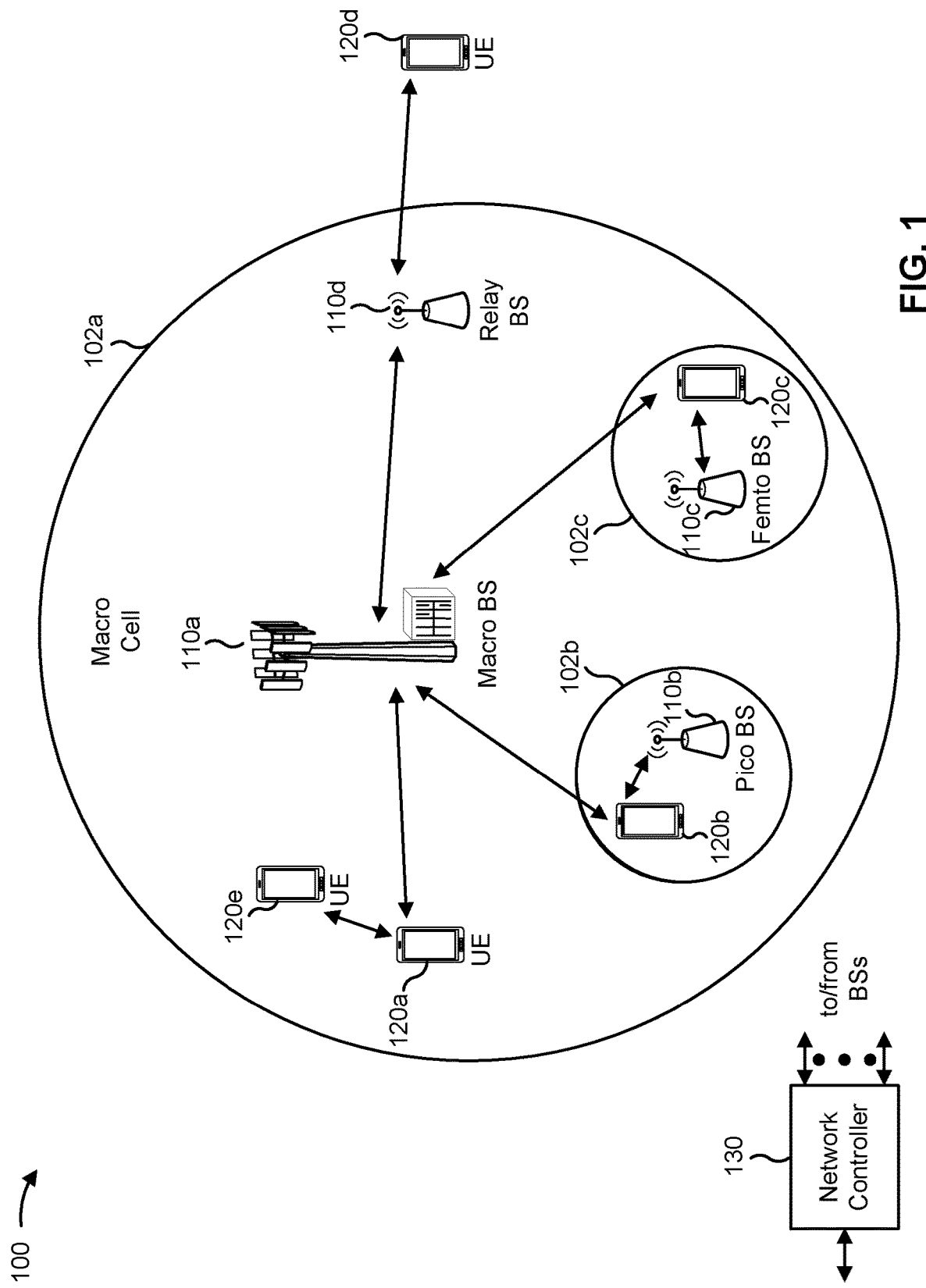
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
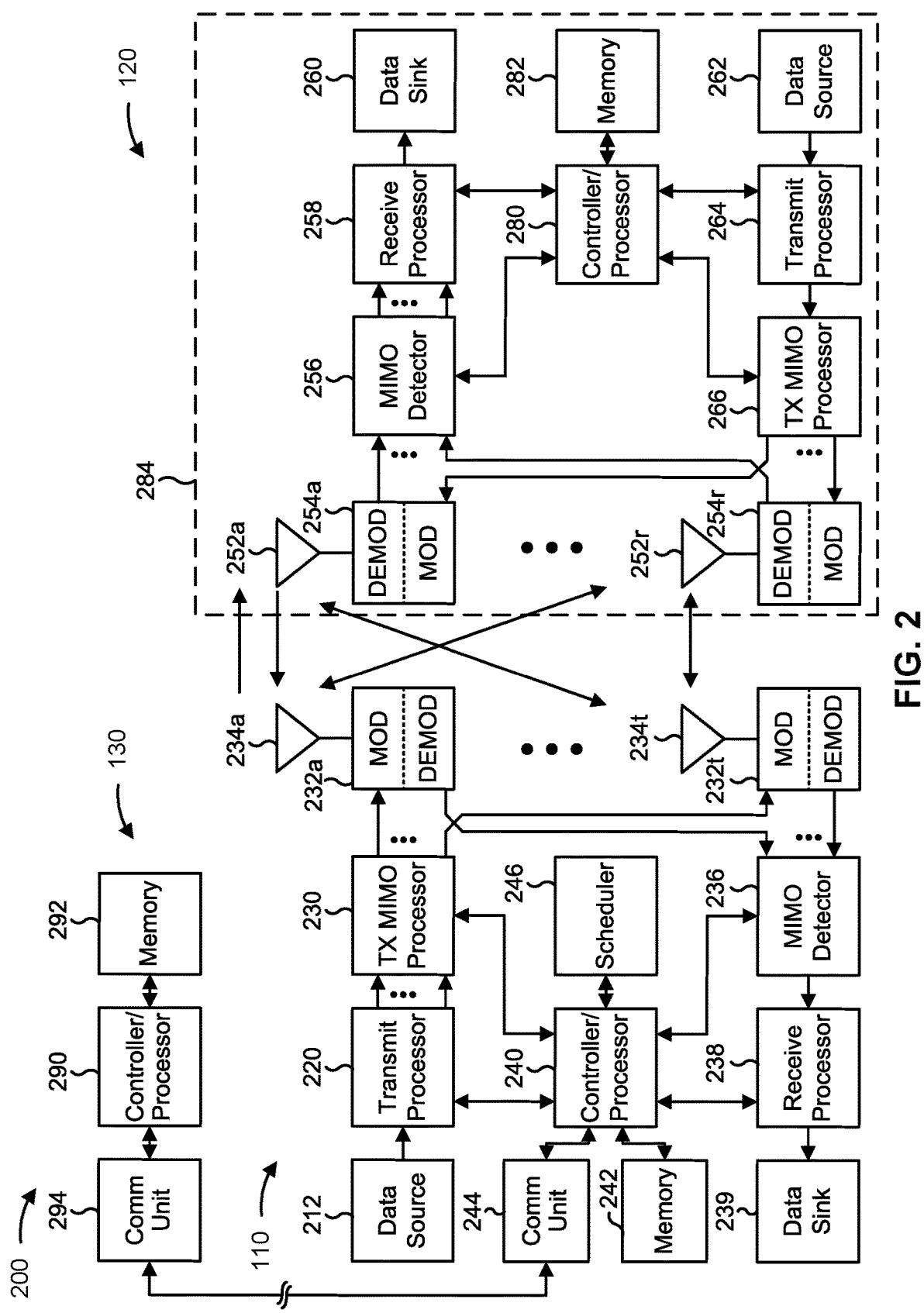
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-8.

Controller/processor 240 of base station 110, controller/processor 280 of UE 120, and/or any other component(s) of FIG. 2 may perform one or more techniques associated with performing a handover based at least in part on a predicted UE mobility, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., UE 120) includes means for determining predicted mobility information associated with the UE that indicates a predicted route of the UE and one or more cells associated with the predicted route; means for transmitting the predicted mobility information to a source base station; and/or means for performing a handover of the UE from the source base station to a target base station based at least in part on the predicted mobility information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from the source base station, a configuration for a plurality of potential target base stations based at least in part on the predicted mobility information.

In some aspects, the UE includes means for receiving, from the source base station, UE-specific measurement objects and corresponding thresholds for event reporting based at least in part on the predicted mobility information; and/or means for transmitting measurement reports to the source base station based at least in part on the UE-specific measurement objects and the corresponding thresholds for event reporting, wherein the handover of the UE is triggered at the source base station based at least in part on the measurement reports.

In some aspects, the UE includes means for disabling measurement capturing during a predicted mobility period based at least in part on the predicted mobility information.

In some aspects, the UE includes means for determining candidate radio access technologies (RATs) or cells and associated confidence factors and configurations based at least in part on the predicted mobility information; and/or means for determining a dedicated data subscription based at least in part on a data throughput associated with the candidate RATs or cells and associated confidence factors and configurations.

In some aspects, the UE includes means for receiving, from the source base station, a radio resource management (RRM) configuration based at least in part on the predicted mobility information; and/or means for performing measurements based at least in part on the RRM configuration.

In some aspects, a source base station (e.g., base station 110) includes means for receiving, from a UE, predicted mobility information that indicates a predicted route of the UE and one or more cells associated with the predicted route, wherein the predicted mobility information indicates a confidence level for each of the one or more cells associated with the predicted route; and/or means for enabling a handover of the UE from the source base station to a target base station based at least in part on the predicted mobility information. The means for the source base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the source base station includes means for transmitting, to the UE, a configuration for a plurality of potential target base stations based at least in part on the predicted mobility information, wherein the configuration enables the handover to be triggered at the UE.

In some aspects, the source base station includes means for triggering the handover of the UE to the target base station based at least in part on the predicted mobility information.

In some aspects, the source base station includes means for transmitting, to the UE, UE-specific measurement objects and corresponding thresholds for event reporting based at least in part on the predicted mobility information; means for receiving, from the UE, measurement reports based at least in part on the UE-specific measurement objects and the corresponding thresholds for event reporting; and/or means for triggering the handover of the UE based at least in part on the measurement reports.

In some aspects, the source base station includes means for disabling a configuration associated with neighbor base stations for the UE during a predicted mobility period based at least in part on the predicted mobility information.

In some aspects, the source base station includes means for transmitting, to the UE, an RRM configuration based at least in part on the predicted mobility information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Deep learning enhanced wireless communications may be useful in solving wireless challenges, such as hard-to-model problems, computational infeasibility of optimal solutions, efficient modern parameter optimization, and non-linearity. Deep learning capabilities may be based at least in part on deep wireless domain information. Deep learning may be applied to wireless communications to determine appropriate representations for hard-to-model problems, determine near-ideal and computationally realizable solutions, and model non-linear functions.

UE mobility involves UEs that move between different cells in a network. The UEs that move between the different cells may be handed over between different base stations operating in the network. Early and late handovers are potential issues that may arise during UE mobility, which may reduce UE performance and cause radio link failures (RLFs). An early handover may cause RLF to occur shortly after a successful handover to a target cell. A late handover may cause RLF to occur in a serving cell before the handover or during a handover procedure.

A conditional handover may mitigate late handover issues by minimizing a number of RLFs during a mobility scenario. Conditional handover may provide an optimized handover procedure to reduce a total handover time, thereby minimizing the number of RLFs.

Figure 3:
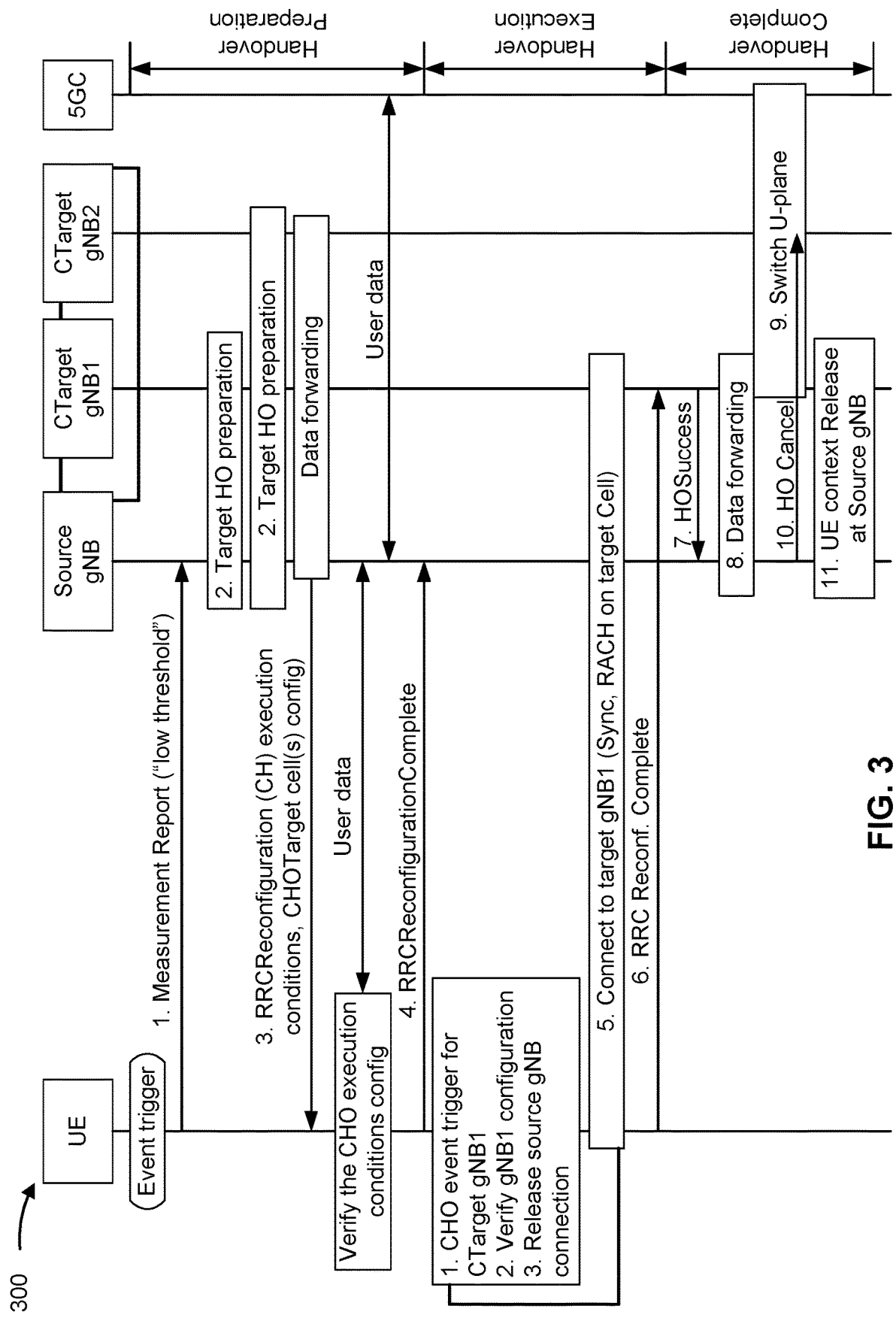
FIG. 3 is a diagram illustrating an example of conditional handover, in accordance with the present disclosure.

FIG. 3 is a diagram illustrating an example 300 of conditional handover, in accordance with the present disclosure. As shown in FIG. 3, example 300 includes communication between a UE (e.g., UE 120), a source gNB (e.g., base station 110), a first conditional target gNB (CTarget gNB1), a second conditional target gNB (CTarget gNB2), and a 5G core (5GC). In some aspects, the UE, the source gNB, the first conditional target gNB, the second conditional target gNB, and the 5GC may be included in a wireless network such as wireless network 100.

In a first action, the UE may transmit a measurement report to the source gNB based at least in part on an event trigger at the UE. The measurement report may indicate a measurement that does not satisfy a threshold. In a second action, the source gNB may perform a target handover preparation. The source gNB may perform the target handover preparation with multiple conditional target gNBs, such as the first conditional target gNB and the second conditional target gNB. In a third action, the source gNB may transmit, to the UE, a radio resource control (RRC) reconfiguration message that indicates conditional handover execution conditions, and a conditional handover target cells configuration, which may indicate the first conditional target gNB and the second conditional target gNB. The UE may verify the RRC reconfiguration message with the conditional handover execution conditions, as received by the source gNB. Further, during this time, the UE may communicate user data with the source gNB, which may forward the user data to the 5GC.

In a fourth action, the UE may transmit an RRC reconfiguration complete message to the source gNB. As an example, the UE may detect a conditional handover event trigger for the first conditional target gNB. The UE may verify a first conditional target gNB configuration that was previously received from the source gNB. The UE may release a connection with the source gNB. In a fifth action, the UE may connect to the first conditional target gNB, which may involve performing a synchronization and a random access channel (RACH) procedure with the first conditional target gNB. In a sixth action, the UE may transmit an RRC reconfiguration complete message to the first conditional target gNB. In other words, the UE may detect the conditional handover event trigger for the first conditional target gNB and connect to the first conditional target gNB based at least in part on the RRC reconfiguration message that was previously received from the source gNB, which included the conditional handover execution conditions and the conditional handover target cells configuration.

In a seventh action, the first conditional target gNB may transmit a message to the source gNB that indicates a handover success with the UE. In an eighth action, the first conditional target gNB may forward data to the source gNB, or vice versa. In a ninth action, the second conditional target gNB may switch a user plane, and in a tenth action, the source gNB may transmit a message to the second conditional target gNB that indicates a handover cancellation. In an eleventh action, the source gNB may release UE context information.

As indicated above, FIG. 3 is provided as an example. Other examples may differ from what is described with regard to FIG. 3.

As a UE travels between different cells, the UE may be handed over between different base stations in the different cells. For example, the UE may be handed over from a first base station to a second base station as the UE travels between a first cell associated with the first base station and a second cell associated with the second base station. Early and late handovers are potential issues that may arise during UE mobility between different cells, which may reduce UE performance and cause RLFs for the UE. Early handover may cause RLF to occur shortly after a successful handover to a target cell, and late handover may cause RLF to occur in a serving cell before the handover or during a handover procedure.

In various aspects of techniques and apparatuses described herein, a likelihood of early handover and/or late handover may be reduced based at least in part on an ML-assisted approach. A UE may use a machine learning model or related techniques for predicting a mobility of the UE. For example, the UE may determine a predicted route for the UE based at least in part on a current location of the UE, destination information, past movements of the UE, a time of day, user appointment information, etc. The UE may determine, for the predicted route, one or more cells that are associated with the predicted route. The UE may transmit predicted mobility information indicating the predicted route to a base station. The base station may trigger a handover of the UE based at least in part on the predicted mobility information. Alternatively, the base station may transmit a configuration of potential target cells to the UE based at least in part on the predicted mobility information, which may enable the UE to trigger the handover as opposed to the base station. The predicted mobility information may allow the UE to receive a configuration for potential target cells that the UE is likely to traverse when traveling to a destination, thereby increasing a likelihood that the UE is able to successfully connect to the target cells without RLFs. Further, the configuration for potential target cells based at least in part on the predicted mobility information may improve a handover procedure for the UE, as a likelihood of early handover or late handover may be reduced based at least in part on the configuration for potential target cells.

Figure 4:
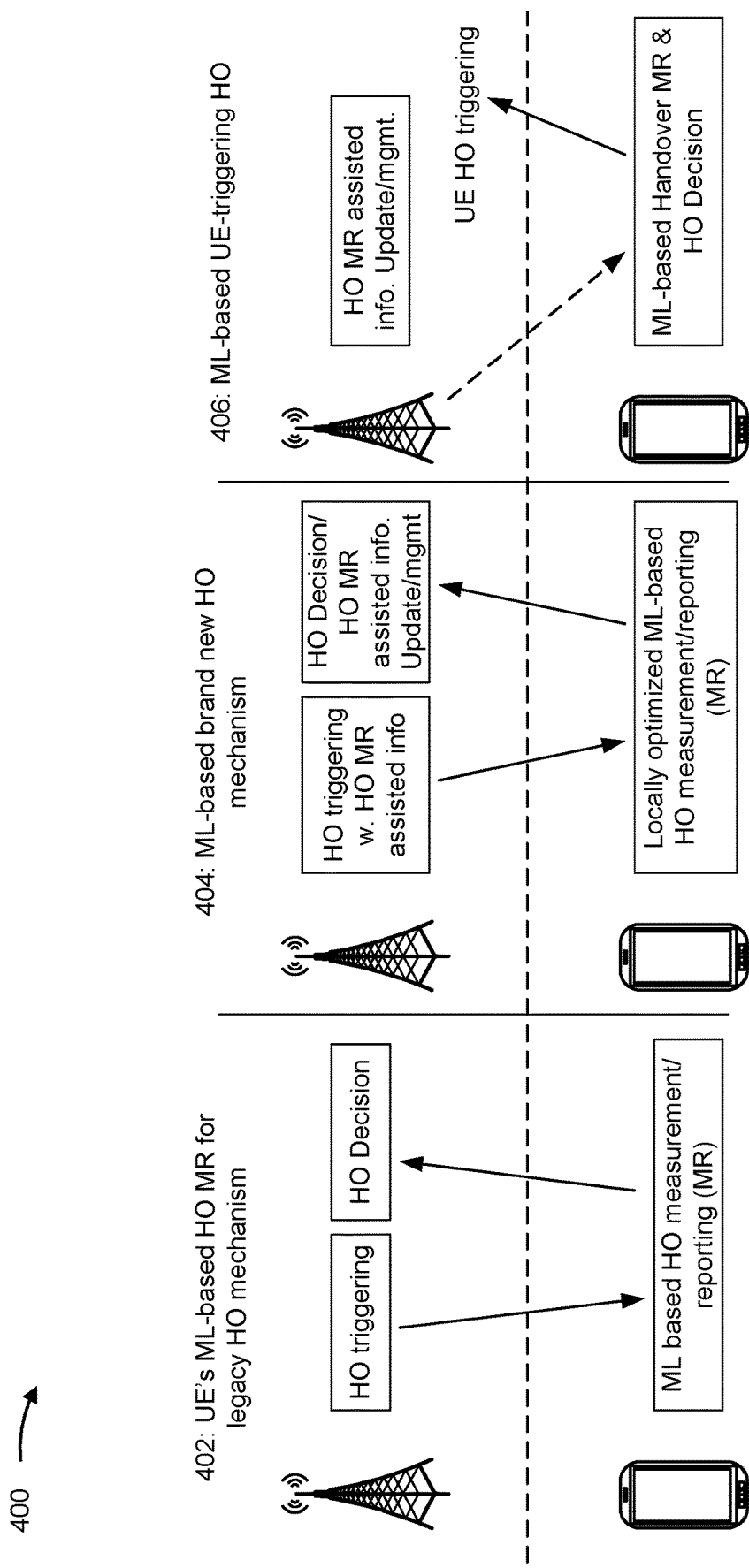
FIG. 4 is a diagram illustrating an example of machine learning (ML)-based UE mobility optimizations, in accordance with the present disclosure.

FIG. 4 is a diagram illustrating an example 400 of ML-based UE mobility optimizations, in accordance with the present disclosure.

In some aspects, a UE may run a machine learning model and predict upcoming mobility states based at least in part on the machine learning model. The UE may transmit an ML-based handover measurement report to a base station. The ML-based handover measurement report may be based at least in part on the predicted upcoming mobility states. The base station may trigger a handover for the UE based at least in part on the ML-based handover measurement report. In this case, a handover triggering and a handover decision may be made at the base station.

As shown by reference number 402, an ML-based handover measurement report from a UE may be used for a legacy handover mechanism. For example, a base station may trigger a handover for a UE, and the UE may transmit the ML-based handover measurement report to the base station. The base station may perform a handover decision for the UE based at least in part on the ML-based handover measurement report. In this case, the handover triggering and the handover decision may be performed at the base station.

As shown by reference number 404, an ML-based handover mechanism may be used. For example, a base station may trigger a handover for a UE. The handover triggering may include handover measurement report assisted information. The UE may determine and transmit, to the base station, a locally optimized ML-based handover measurement report based at least in part on the handover measurement report assisted information. The base station may perform a handover decision for the UE based at least in part on the ML-based handover measurement report. Further, the base station may update the handover measurement report assisted information based at least in part on the ML-based handover measurement report received from the UE. In this case, the handover triggering and the handover decision may be performed at the base station.

In some aspects, a UE may run a machine learning model and predict upcoming mobility states based at least in part on the machine learning model. The UE may determine an ML-based handover measurement report based at least in part on the predicted upcoming mobility states. The UE may trigger a handover based at least in part on the ML-based handover measurement report.

As shown by reference number 406, an ML-based UE-triggered handover may be employed. For example, a base station may transmit handover measurement report assisted information to a UE. In some cases, the handover measurement report assisted information may be updated handover measurement report assisted information. The UE may determine an ML-based handover measurement report. The UE may perform a handover decision and trigger a handover based at least in part on the handover decision. In this case, the handover triggering and the handover decision may be performed at the UE and not at the base station.

As indicated above, FIG. 4 is provided as an example. Other examples may differ from what is described with regard to FIG. 4.

Figure 5:
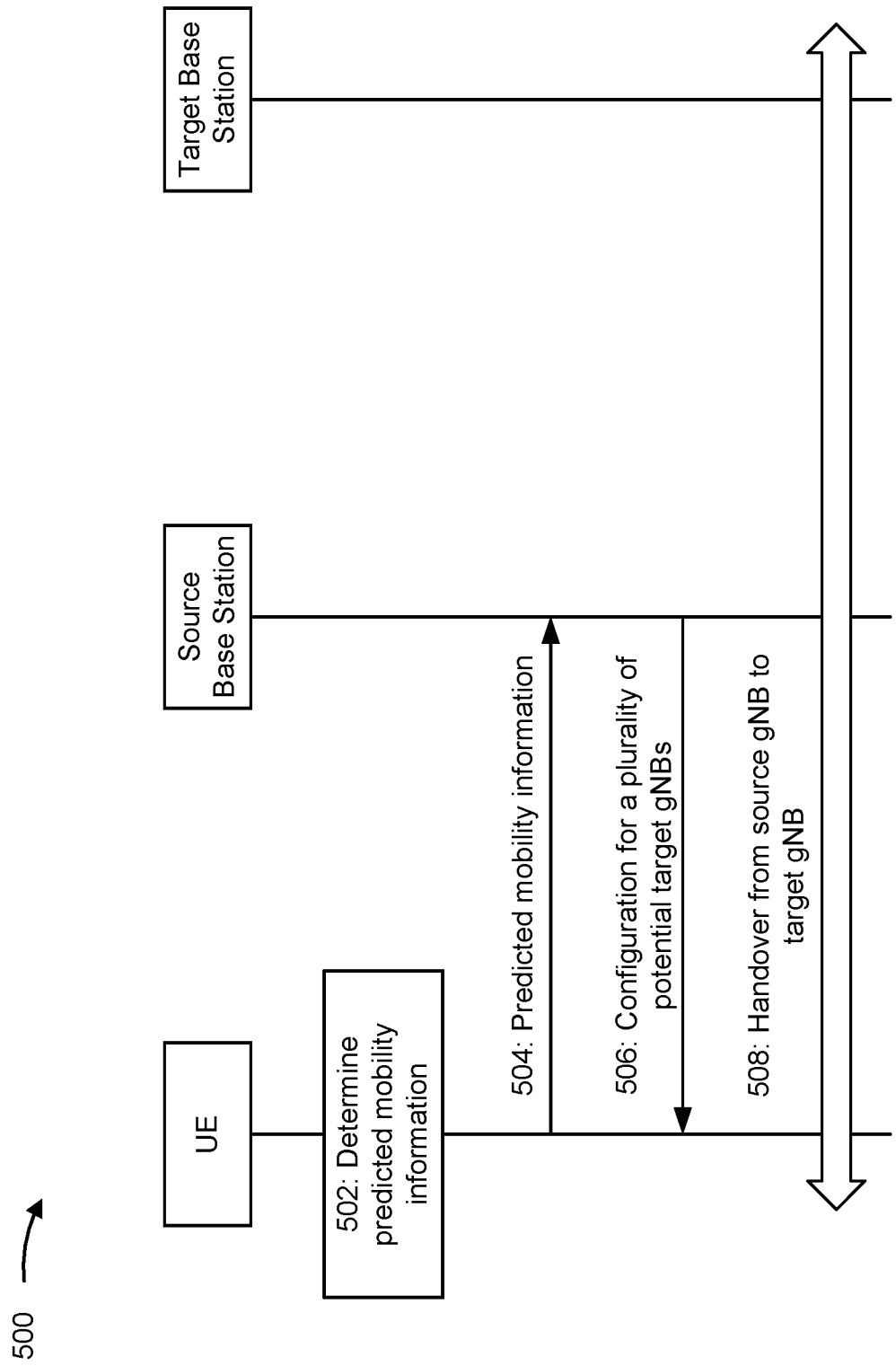
FIGS. 5-6 are diagrams illustrating examples associated with performing a handover based at least in part on a predicted UE mobility, in accordance with the present disclosure.

FIG. 5 is a diagram illustrating an example 500 associated with performing a handover based at least in part on a predicted UE mobility, in accordance with the present disclosure. As shown in FIG. 5, example 500 includes communication between a UE (e.g., UE 120) and a base station (e.g., base station 110). In some aspects, the UE and the base station may be included in a wireless network such as wireless network 100.

In some aspects, the UE may be a mobile device or a smart watch. In some aspects, the UE may be associated with an in-vehicle system of a vehicle.

As shown by reference number 502, the UE may determine predicted mobility information for the UE that indicates a predicted route of the UE and one or more cells associated with the predicted route. The predicted mobility information may indicate a confidence level for each of the one or more cells associated with the predicted route. The confidence level may indicate a likelihood that a given cell will be traversed by the UE.

In some aspects, the UE may determine the predicted mobility information based at least in part on historical measurement reports generated by the UE. In some aspects, the UE may determine the predicted mobility information based at least in part on a current location of the UE and a destination of the UE. The destination may be indicated in a navigation application executing on the UE. In some aspects, the UE may determine the predicted mobility information based at least in part on a current location of the UE, a time of day, and historical movements of the UE. In some aspects, the UE may determine the predicted mobility information based at least in part on a current location of the UE and calendar information associated with a user of the UE.

In some aspects, the UE may determine the predicted mobility information based at least in part on a machine learning model that is deployed at the UE. The UE may have sufficient memory and processing capabilities to run the machine learning model. Further, the UE may have various sensors and/or capabilities to perform data collection and mining, which may be provided to the machine learning model to predict a user mobility.

In some aspects, the machine learning model may be based at least in part on one or more UE-specific parameters including a receiver sensitivity for different bands, and UE-specific thresholds based at least in part on band combinations and a UE transmit power due to other active radios at the UE, such a wireless local area network (WLAN). In other words, the machine learning model may be individually configured for particular UEs.

In some aspects, the UE may identify a current location associated with the UE, a destination of the UE (e.g., a destination entered into a navigation application that is executing on the UE), a time of day, past user behaviors and activities, user appointment information, user calendar information, etc. to predict the UE mobility. In other words, the UE may determine a predicted route of the UE based at least in part on the current location, destination information, time of day, past user behaviors and activities (e.g., the UE generally travels between home and an office at 9 AM on weekdays), user appointment information, user calendar information, etc. In some aspects, the UE may determine the predicted route of the UE based at least in part on past measurement reports generated by the UE. The past measurement reports may indicate cells that have been previously measured by the UE and times associated with the measurements, thereby providing a historical record of previously visited cells by the UE. In some aspects, the UE may consider historical radio link failure (RLF) information for the UE with respect to certain cells that caused the RLF. In some aspects, the UE may determine a list of upcoming cells or a list of potentially traversed cells based at least in part on the predicted route. In other words, the UE may determine which cells overlap the predicted route. Further, the UE may assign a confidence factor to each of the predicted cells, which may indicate a likelihood that a particular cell is traversed by the UE.

As shown by reference number 504, the UE may transmit the predicted mobility information to the source base station. As a result, the source base station may become aware of the predicted route that may be taken by the UE and one or more cells associated with the predicted route.

As shown by reference number 506, the UE may receive, from the source base station, a configuration for a plurality of potential target base stations based at least in part on the predicted mobility information. The potential target base stations may correspond to the one or more cells associated with the predicted route, as indicated by the predicted mobility information. In other words, the potential target base stations may be included in cells that the UE is expected to traverse while traveling along the predicted route to a destination. In some aspects, the source base station may transmit, to the UE, an RRC reconfiguration message that indicates the potential target base stations, as well as configuration information that enables the UE to connect to the potential target base stations during a handover of the UE. In some aspects, the configuration transmitted by the source base station may not indicate target base stations that the UE is not expected to connect to, based at least in part on the predicted mobility information, thereby presenting the UE with more targeted information based at least in part on the predicted mobility information.

In some aspects, the source base station may reserve resources for the UE to connect to the potential target base stations based at least in part on the predicted mobility information. In other words, due to an increased likelihood that the UE may attempt to connect to some of the potential target base stations, based at least in part on the predicted mobility information, the source base station may reserve the resources to ensure that the UE is able to connect to some of the potential target base stations when moving from a current location to the destination.

As shown by reference number 508, the UE may be handed over from the source base station to the target base station based at least in part on the predicted mobility information. In some aspects, the UE may trigger the handover from the source base station to the target base station. In other words, a handover decision may be made at the UE, as opposed to the source base station. The UE may trigger the handover to the target base station, which may be one of the target base stations indicated in the configuration for the plurality of potential target base stations, which was previously received at the UE from the source base station and is based at least in part on the predicted mobility information. In other words, the configuration for the plurality of potential target base stations may enable the handover to be triggered at the UE, as the configuration may provide the UE with handover information to connect to the target base station.

In some aspects, the source base station may receive, from the UE, the predicted mobility information and historical measurement reports from the UE. The source base station may determine potential time intervals for the UE reaching coverage of different cells based at least in part on the predicted mobility information and/or the historical measurement reports. The source base station may reserve resources with target base stations associated with the predicted mobility information, which may provide the UE with a greater likelihood of connecting to the target base stations. Further, the source base station may generate a targeted list of cells for conditional handover, which may be transmitted to the UE, and which may enable the UE to perform a handover using one or more target base stations indicated in the targeted list of cells.

In some aspects, the UE may determine candidate RATs or cells and associated confidence factors and configurations based at least in part on the predicted mobility information. The UE may determine a dedicated data subscription (DDS) based at least in part on a data throughput associated with the candidate RATs or cells and associated confidence factors and configurations. For example, the UE may determine, based at least in part on the predicted mobility information, potential candidate RATs/cells and associated confidence factors and configurations, where the configurations may indicate bands, bandwidths, MIMO support, etc. Further, the UE may determine a preferred DDS subscription and/or perform DDS switching based at least in part on the potential candidate RATs/cells and associated confidence factors and configurations.

In some aspects, the UE may receive, from the source base station, an RRM configuration based at least in part on the predicted mobility information. The UE may perform measurements based at least in part on the RRM configuration. For example, the RRM configuration may be determined based at least in part on a UE's predicted mobility conditions, and the RRM configuration may affect measurements that are performed by the UE. The UE may capture measurements with a greater frequency when the predicted mobility information and past measurement reports along a certain route indicate a relatively fast UE mobility and an increased likelihood of late handovers. On the other hand, the UE may capture measurements with less frequency when the predicted mobility information and past measurement reports along a certain route indicate a relatively slow UE mobility and a decreased likelihood of late handovers.

As indicated above, FIG. 5 is provided as an example. Other examples may differ from what is described with regard to FIG. 5.

Figure 6:
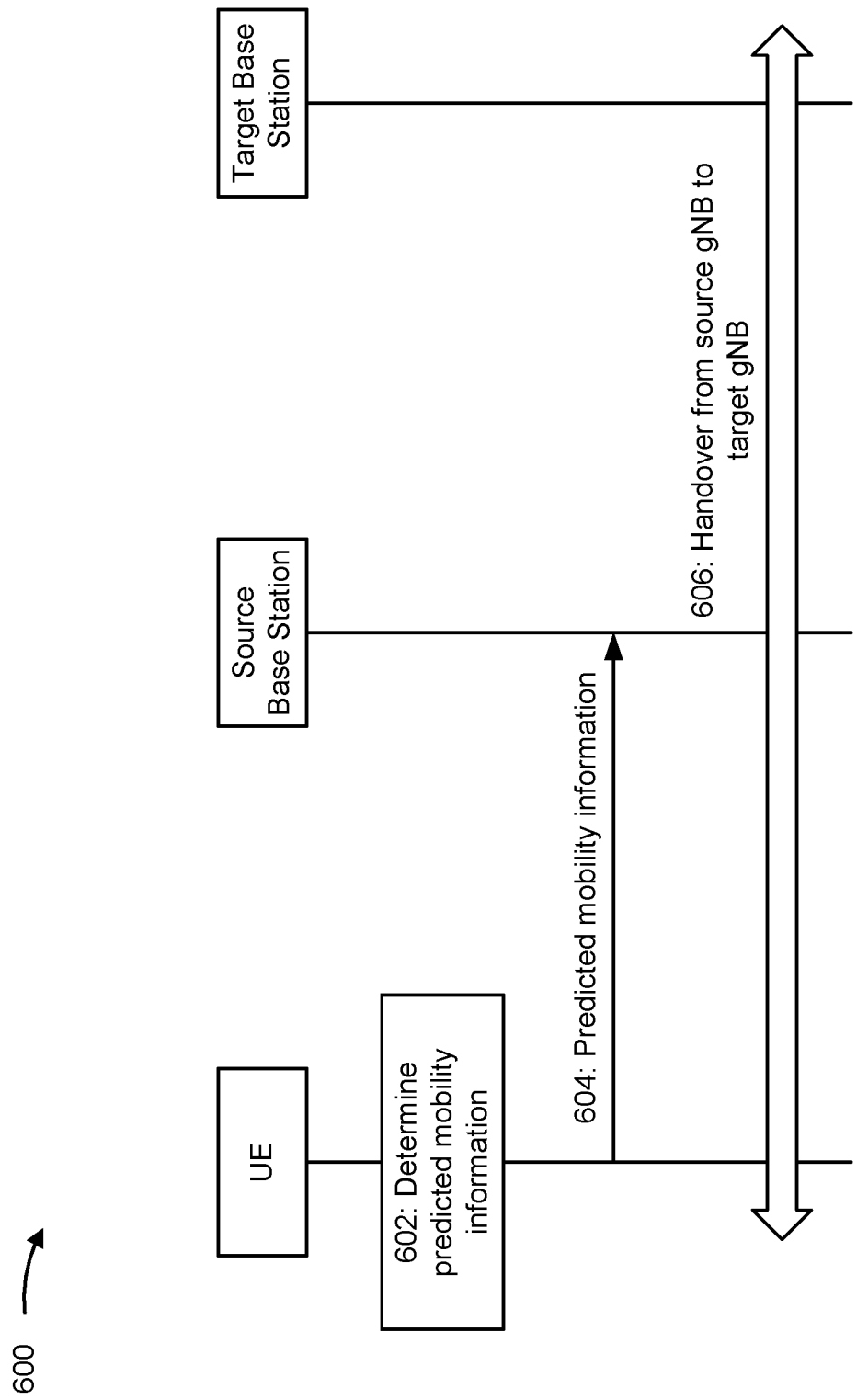

FIG. 6 is a diagram illustrating an example 600 associated with performing a handover based at least in part on a predicted UE mobility, in accordance with the present disclosure. As shown in FIG. 6, example 600 includes communication between a UE (e.g., UE 120) and a base station (e.g., base station 110). In some aspects, the UE and the base station may be included in a wireless network such as wireless network 100.

As shown by reference number 602, the UE may determine predicted mobility information for the UE, as shown by reference number 502.

As shown by reference number 604, the UE may transmit the predicted mobility information to the source base station, as shown by reference number 504.

As shown by reference number 606, the UE may be handed over from the source base station to the target base station based at least in part on the predicted mobility information. In some aspects, the source base station may trigger the handover from the source base station to the target base station, based at least in part on the predicted mobility information. In other words, a handover decision may be made at the source base station, as opposed to the UE.

In some aspects, the source base station may transmit, to the UE, UE-specific measurement objects and corresponding thresholds for event reporting based at least in part on the predicted mobility information. In other words, based at least in part on the predicted mobility information (e.g., expected cells to be traversed by the UE), the source base station may configure UE-specific measurement objects and corresponding thresholds for event reporting. The source base station may receive, from the UE, measurement reports based at least in part on the UE-specific measurement objects and the corresponding thresholds for event reporting. The source base station may trigger the handover of the UE based at least in part on the measurement reports. For example, the source base station may trigger the handover based at least in part on the measurement reports indicating measurement values that do not satisfy a threshold, thereby indicating that the UE does not have a favorable connection with the source base station and should be handed over to the target base station. In some aspects, the predicted mobility information may enable the source base station to receive improved measurement reports from the UE, and a handover decision may be performed by the source base station and not the UE based at least in part on the improved measurement reports.

In some aspects, the UE may transmit the predicted mobility information to the source base station, which may indicate a probable list of cells to be visited by the UE based at least in part on a predicted mobility of the UE. The predicted mobility information may indicate, for each cell, a confidence factor that indicates a likelihood that the UE will visit that cell. The source base station may estimate a route to be taken by the UE and configure UE-specific measurement objects and respective thresholds for event reporting. The UE-specific measurement objects and respective thresholds for event reporting may correspond to cells on the estimated route to be taken by the UE. The UE may perform measurements based at least in part on the UE-specific measurement objects and respective thresholds, and report the measurements to the source base station. The source base station may perform a handover decision for the UE based at least in part on the reported measurements from the UE.

In some aspects, the UE may disable measurement capturing at the UE during a predicted mobility period based at least in part on the predicted mobility information. The source base station may disable a configuration associated with neighbor base stations for the UE during the predicted mobility period based at least in part on the predicted mobility information. In other words, the source base station may stop configuring measurement objects for neighbor cells associated with the UE, and/or the UE may pause capturing measurements and measurement reporting during the predicted mobility period.

As indicated above, FIG. 6 is provided as an example. Other examples may differ from what is described with regard to FIG. 6.

Figure 7:
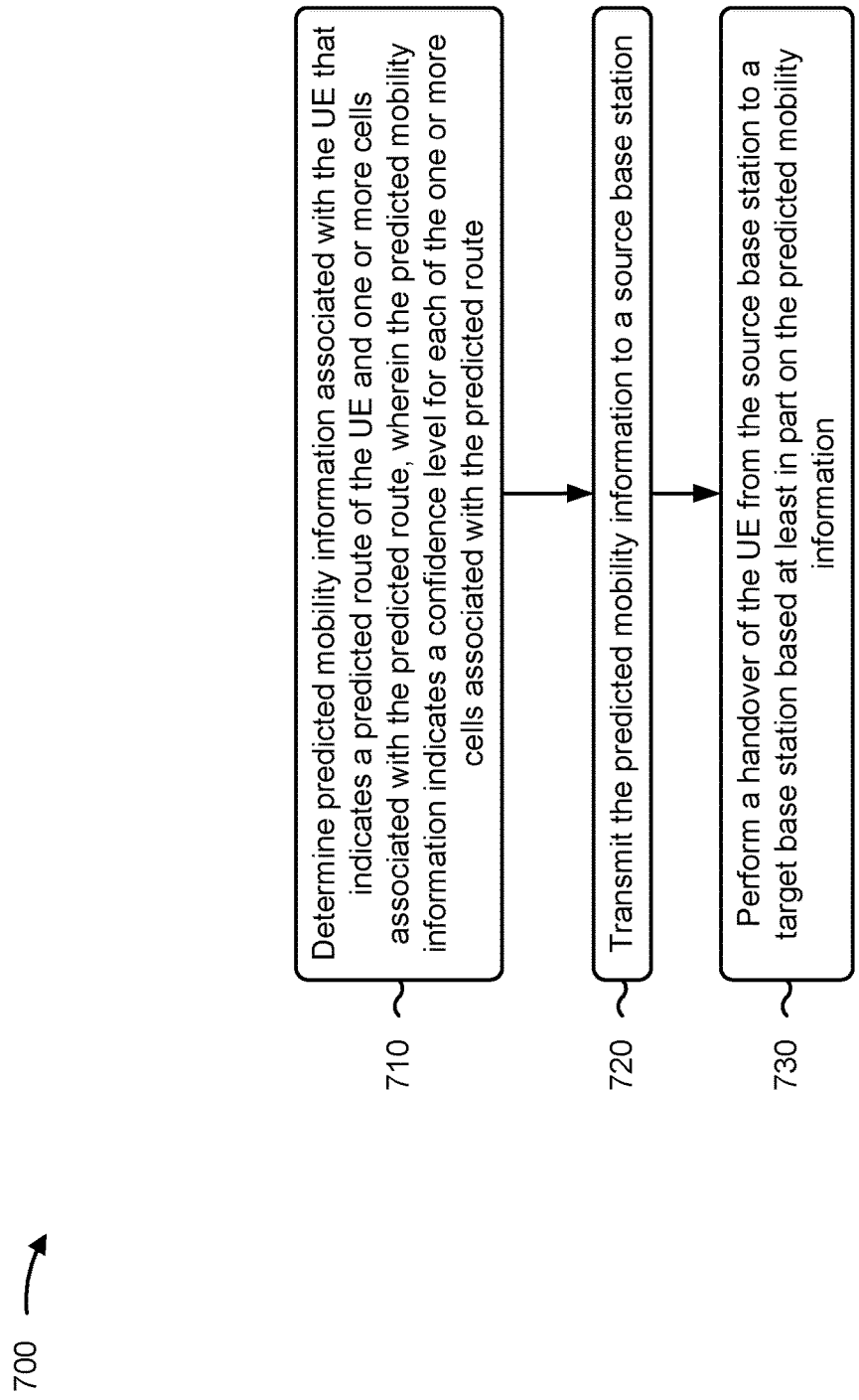
FIGS. 7-8 are diagrams illustrating example processes associated with performing a handover based at least in part on a predicted UE mobility, in accordance with the present disclosure.

FIG. 7 is a diagram illustrating an example process 700 performed, for example, by a UE, in accordance with the present disclosure. Example process 700 is an example where the UE (e.g., UE 120) performs operations associated with performing a handover based at least in part on a predicted UE mobility.

As shown in FIG. 7, in some aspects, process 700 may include determining predicted mobility information associated with the UE that indicates a predicted route of the UE and one or more cells associated with the predicted route, wherein the predicted mobility information indicates a confidence level for each of the one or more cells associated with the predicted route (block 710). For example, the UE (e.g., using determination component 908, depicted in FIG. 9) may determine predicted mobility information associated with the UE that indicates a predicted route of the UE and one or more cells associated with the predicted route, wherein the predicted mobility information indicates a confidence level for each of the one or more cells associated with the predicted route, as described above.

As further shown in FIG. 7, in some aspects, process 700 may include transmitting the predicted mobility information to a source base station (block 720). For example, the UE (e.g., using transmission component 904, depicted in FIG. 9) may transmit the predicted mobility information to a source base station, as described above.

As further shown in FIG. 7, in some aspects, process 700 may include performing a handover of the UE from the source base station to a target base station based at least in part on the predicted mobility information (block 730). For example, the UE (e.g., using performance component 910, depicted in FIG. 9) may perform a handover of the UE from the source base station to a target base station based at least in part on the predicted mobility information, as described above.

Process 700 may include additional aspects, such as any single aspect or any combination of aspects described below and/or in connection with one or more other processes described elsewhere herein.

In a first aspect, determining the predicted mobility information comprises determining the predicted mobility information based at least in part on historical measurement reports generated by the UE.

In a second aspect, alone or in combination with the first aspect, the confidence level indicates a likelihood that a given cell will be traversed by the UE.

In a third aspect, alone or in combination with one or more of the first and second aspects, determining the predicted mobility information comprises determining the predicted mobility information based at least in part on a current location of the UE and a destination of the UE, wherein the destination is indicated in a navigation application associated with the UE.

In a fourth aspect, alone or in combination with one or more of the first through third aspects, determining the predicted mobility information comprises determining the predicted mobility information based at least in part on a current location of the UE, a time of day, and historical movements of the UE.

In a fifth aspect, alone or in combination with one or more of the first through fourth aspects, determining the predicted mobility information comprises determining the predicted mobility information based at least in part on a current location of the UE and calendar information associated with a user of the UE.

In a sixth aspect, alone or in combination with one or more of the first through fifth aspects, process 700 includes receiving, from the source base station, a configuration for a plurality of potential target base stations based at least in part on the predicted mobility information, performing the handover comprises triggering the handover of the UE to the target base station indicated in the configuration for the plurality of potential target base stations, and the target base station is associated with reserved resources for the UE based at least in part on the predicted mobility information.

In a seventh aspect, alone or in combination with one or more of the first through sixth aspects, performing the handover comprises performing the handover based at least in part on a handover triggering at the source base station based at least in part on the predicted mobility information.

In an eighth aspect, alone or in combination with one or more of the first through seventh aspects, determining the predicted mobility information comprises determining the predicted mobility information based at least in part on a machine learning model that is deployed at the UE.

In a ninth aspect, alone or in combination with one or more of the first through eighth aspects, the machine learning model is based at least in part on one or more UE-specific parameters including a receiver sensitivity for different bands, and UE-specific thresholds based at least in part on band combinations and a UE transmit power due to other active radios at the UE.

In a tenth aspect, alone or in combination with one or more of the first through ninth aspects, process 700 includes receiving, from the source base station, UE-specific measurement objects and corresponding thresholds for event reporting based at least in part on the predicted mobility information, and transmitting measurement reports to the source base station based at least in part on the UE-specific measurement objects and the corresponding thresholds for event reporting, wherein the handover of the UE is triggered at the source base station based at least in part on the measurement reports.

In an eleventh aspect, alone or in combination with one or more of the first through tenth aspects, process 700 includes disabling measurement capturing during a predicted mobility period based at least in part on the predicted mobility information.

In a twelfth aspect, alone or in combination with one or more of the first through eleventh aspects, process 700 includes determining candidate RATs or cells and associated confidence factors and configurations based at least in part on the predicted mobility information, and determining a dedicated data subscription based at least in part on a data throughput associated with the candidate RATs or cells and associated confidence factors and configurations.

In a thirteenth aspect, alone or in combination with one or more of the first through twelfth aspects, process 700 includes receiving, from the source base station, an RRM configuration based at least in part on the predicted mobility information, and performing measurements based at least in part on the RRM configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
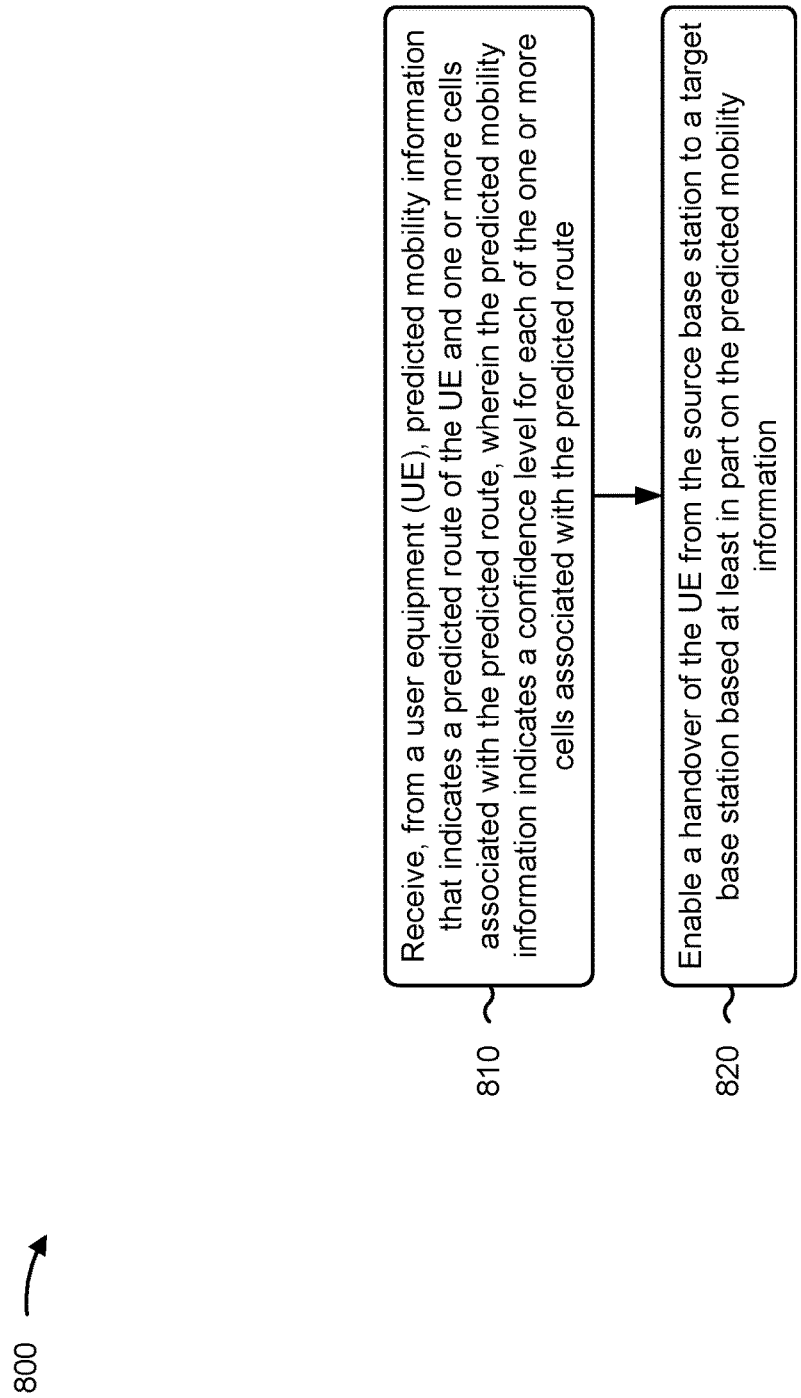

FIG. 8 is a diagram illustrating an example process 800 performed, for example, by a source base station, in accordance with the present disclosure. Example process 800 is an example where the source base station (e.g., base station 110) performs operations associated with performing a handover based at least in part on a predicted UE mobility.

As shown in FIG. 8, in some aspects, process 800 may include receiving, from a UE, predicted mobility information that indicates a predicted route of the UE and one or more cells associated with the predicted route, wherein the predicted mobility information indicates a confidence level for each of the one or more cells associated with the predicted route (block 810). For example, the source base station (e.g., using reception component 1002, depicted in FIG. 10) may receive, from a UE, predicted mobility information that indicates a predicted route of the UE and one or more cells associated with the predicted route, wherein the predicted mobility information indicates a confidence level for each of the one or more cells associated with the predicted route, as described above.

As further shown in FIG. 8, in some aspects, process 800 may include enabling a handover of the UE from the source base station to a target base station based at least in part on the predicted mobility information (block 820). For example, the source base station (e.g., using handover component 1008, depicted in FIG. 10) may enable a handover of the UE from the source base station to a target base station based at least in part on the predicted mobility information, as described above.

Process 800 may include additional aspects, such as any single aspect or any combination of aspects described below and/or in connection with one or more other processes described elsewhere herein.

In a first aspect, the predicted mobility information is based at least in part on historical measurement reports generated by the UE, or the predicted mobility information is based at least in part on a current location of the UE and a destination of the UE.

In a second aspect, alone or in combination with the first aspect, the predicted mobility information is based at least in part on a current location of the UE, a time of day, and historical movements of the UE, or the predicted mobility information is based at least in part on a current location of the UE and calendar information associated with a user of the UE.

In a third aspect, alone or in combination with one or more of the first and second aspects, enabling the handover of the UE further comprises transmitting, to the UE, a configuration for a plurality of potential target base stations based at least in part on the predicted mobility information, wherein the configuration enables the handover to be triggered at the UE.

In a fourth aspect, alone or in combination with one or more of the first through third aspects, process 800 includes reserving resources for the UE to connect to the target base station based at least in part on the predicted mobility information.

In a fifth aspect, alone or in combination with one or more of the first through fourth aspects, enabling the handover of the UE further comprises triggering the handover of the UE to the target base station based at least in part on the predicted mobility information.

In a sixth aspect, alone or in combination with one or more of the first through fifth aspects, the predicted mobility information is derived based at least in part on a machine learning model, wherein the machine learning model is based at least in part on one or more UE-specific parameters including a receiver sensitivity for different bands, and UE-specific thresholds based at least in part on band combinations and a UE transmit power due to other active radios at the UE.

In a seventh aspect, alone or in combination with one or more of the first through sixth aspects, process 800 includes transmitting, to the UE, UE-specific measurement objects and corresponding thresholds for event reporting based at least in part on the predicted mobility information, receiving, from the UE, measurement reports based at least in part on the UE-specific measurement objects and the corresponding thresholds for event reporting, and triggering the handover of the UE based at least in part on the measurement reports.

In an eighth aspect, alone or in combination with one or more of the first through seventh aspects, process 800 includes disabling a configuration associated with neighbor base stations for the UE during a predicted mobility period based at least in part on the predicted mobility information.

In a ninth aspect, alone or in combination with one or more of the first through eighth aspects, process 800 includes transmitting, to the UE, an RRM configuration based at least in part on the predicted mobility information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
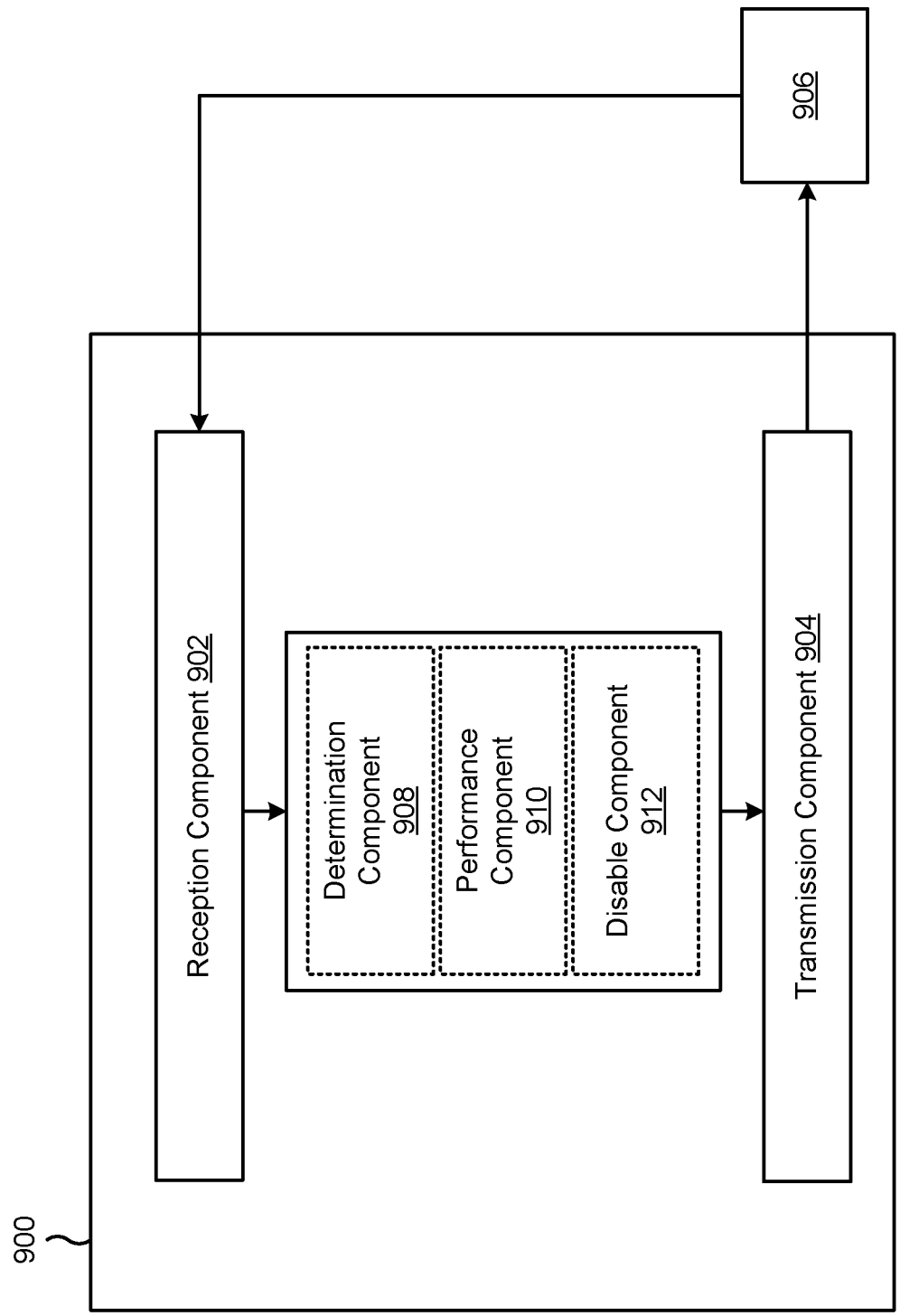
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, a performance component 910, or a disable component 912, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine predicted mobility information associated with the UE that indicates a predicted route of the UE and one or more cells associated with the predicted route. The transmission component 904 may transmit the predicted mobility information to a source base station. The performance component 910 may perform a handover of the UE from the source base station to a target base station based at least in part on the predicted mobility information.

The reception component 902 may receive, from the source base station, a configuration for a plurality of potential target base stations based at least in part on the predicted mobility information.

The reception component 902 may receive, from the source base station, UE-specific measurement objects and corresponding thresholds for event reporting based at least in part on the predicted mobility information. The transmission component 904 may transmit measurement reports to the source base station based at least in part on the UE-specific measurement objects and the corresponding thresholds for event reporting, wherein the handover of the UE is triggered at the source base station based at least in part on the measurement reports.

The disable component 912 may disable measurement capturing during a predicted mobility period based at least in part on the predicted mobility information. The determination component 908 may determine candidate RATs or cells and associated confidence factors and configurations based at least in part on the predicted mobility information. The determination component 908 may determine a dedicated data subscription based at least in part on a data throughput associated with the candidate RATs or cells and associated confidence factors and configurations. The reception component 902 may receive, from the source base station, an RRM configuration based at least in part on the predicted mobility information. The performance component 910 may perform measurements based at least in part on the RRM configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
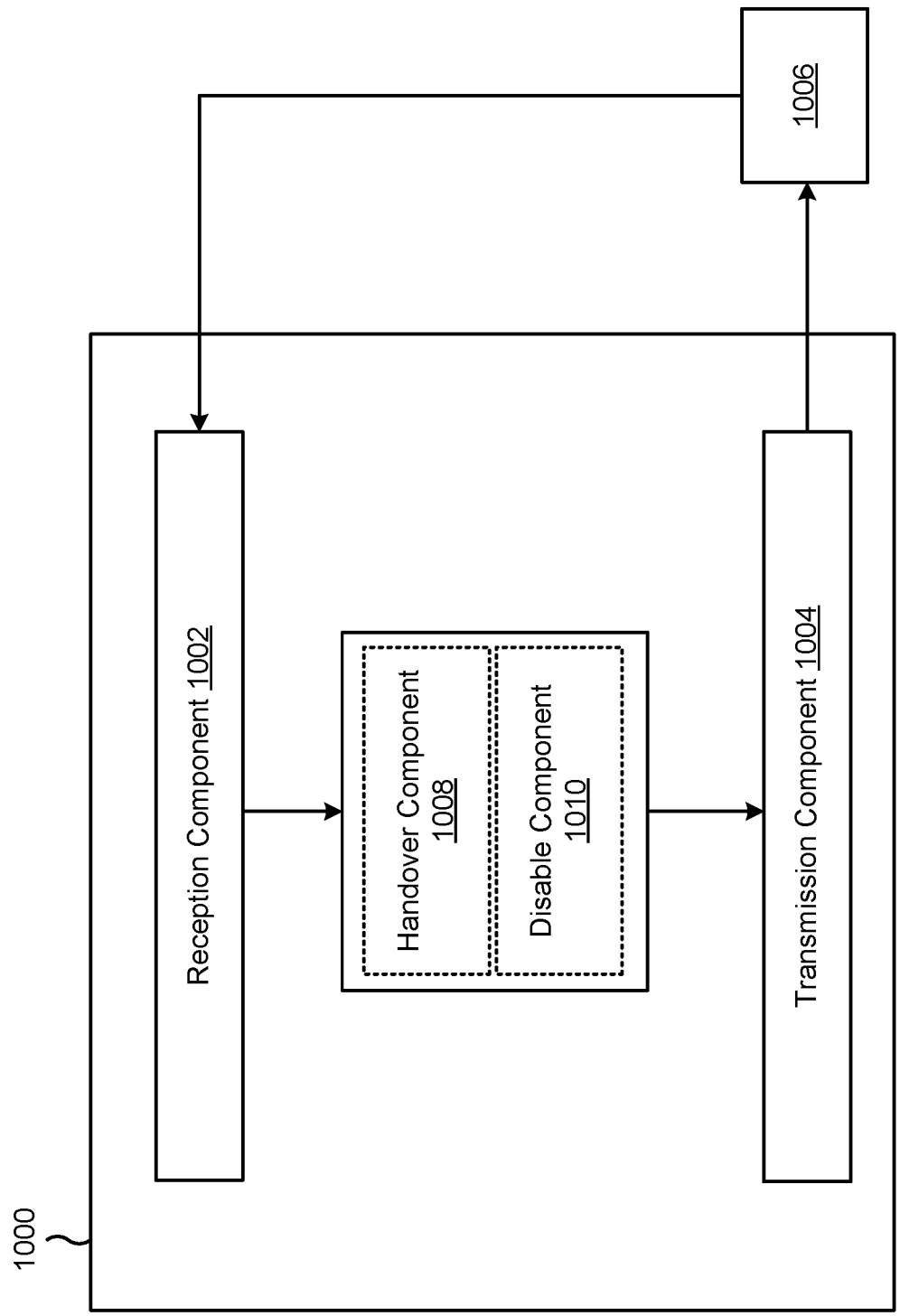

FIG. 10 is a block diagram of an example apparatus 1000 for wireless communication. The apparatus 1000 may be a source base station, or a source base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a handover component 1008, or a disable component 1010, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the source base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the source base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the source base station described above in connection with FIG. 2. In some aspects, the transmission component 1004 may be co-located with the reception component 1002 in a transceiver.

The reception component 1002 may receive, from a UE, predicted mobility information that indicates a predicted route of the UE and one or more cells associated with the predicted route, wherein the predicted mobility information indicates a confidence level for each of the one or more cells associated with the predicted route. The handover component 1008 may enable a handover of the UE from the source base station to a target base station based at least in part on the predicted mobility information.

The transmission component 1004 may transmit, to the UE, UE-specific measurement objects and corresponding thresholds for event reporting based at least in part on the predicted mobility information. The reception component 1002 may receive, from the UE, measurement reports based at least in part on the UE-specific measurement objects and the corresponding thresholds for event reporting. The handover component 1008 may trigger the handover of the UE based at least in part on the measurement reports. The disable component 1010 may disable a configuration associated with neighbor base stations for the UE during a predicted mobility period based at least in part on the predicted mobility information. The transmission component 1004 may transmit, to the UE, a radio resource management configuration based at least in part on the predicted mobility information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: determining predicted mobility information associated with the UE that indicates a predicted route of the UE and one or more cells associated with the predicted route, wherein the predicted mobility information indicates a confidence level for each of the one or more cells associated with the predicted route; transmitting the predicted mobility information to a source base station; and performing a handover of the UE from the source base station to a target base station based at least in part on the predicted mobility information.

Aspect 2: The method of Aspect 1, wherein determining the predicted mobility information comprises determining the predicted mobility information based at least in part on historical measurement reports generated by the UE.

Aspect 3: The method of any of Aspects 1 through 2, wherein the confidence level indicates a likelihood that a given cell will be traversed by the UE.

Aspect 4: The method of any of Aspects 1 through 3, wherein determining the predicted mobility information comprises determining the predicted mobility information based at least in part on a current location of the UE and a destination of the UE, wherein the destination is indicated in a navigation application associated with the UE.

Aspect 5: The method of any of Aspects 1 through 4, wherein determining the predicted mobility information comprises determining the predicted mobility information based at least in part on a current location of the UE, a time of day, and historical movements of the UE.

Aspect 6: The method of any of Aspects 1 through 5, wherein determining the predicted mobility information comprises determining the predicted mobility information based at least in part on a current location of the UE and calendar information associated with a user of the UE.

Aspect 7: The method of any of Aspects 1 through 6, further comprising: receiving, from the source base station, a configuration for a plurality of potential target base stations based at least in part on the predicted mobility information; and wherein performing the handover comprises triggering the handover of the UE to the target base station indicated in the configuration for the plurality of potential target base stations, and wherein the target base station is associated with reserved resources for the UE based at least in part on the predicted mobility information. wherein performing the handover comprises triggering the handover of the UE to the target base station indicated in the configuration for the plurality of potential target base stations, and wherein the target base station is associated with reserved resources for the UE based at least in part on the predicted mobility information.

Aspect 8: The method of any of Aspects 1 through 7, wherein performing the handover comprises performing the handover based at least in part on a handover triggering at the source base station based at least in part on the predicted mobility information.

Aspect 9: The method of any of Aspects 1 through 8, wherein determining the predicted mobility information comprises determining the predicted mobility information based at least in part on a machine learning model that is deployed at the UE.

Aspect 10: The method of Aspect 9, wherein the machine learning model is based at least in part on one or more UE-specific parameters including a receiver sensitivity for different bands, and UE-specific thresholds based at least in part on band combinations and a UE transmit power due to other active radios at the UE.

Aspect 11: The method of any of Aspects 1 through 10, further comprising: receiving, from the source base station, UE-specific measurement objects and corresponding thresholds for event reporting based at least in part on the predicted mobility information; and transmitting measurement reports to the source base station based at least in part on the UE-specific measurement objects and the corresponding thresholds for event reporting, wherein the handover of the UE is triggered at the source base station based at least in part on the measurement reports.

Aspect 12: The method of any of Aspects 1 through 11, further comprising: disabling measurement capturing during a predicted mobility period based at least in part on the predicted mobility information.

Aspect 13: The method of any of Aspects 1 through 12, further comprising: determining candidate radio access technologies (RATs) or cells and associated confidence factors and configurations based at least in part on the predicted mobility information; and determining a dedicated data subscription based at least in part on a data throughput associated with the candidate RATs or cells and associated confidence factors and configurations.

Aspect 14: The method of any of Aspects 1 through 13, further comprising: receiving, from the source base station, a radio resource management (RRM) configuration based at least in part on the predicted mobility information; and performing measurements based at least in part on the RRM configuration.

Aspect 15: A method of wireless communication performed by a source base station, comprising: receiving, from a user equipment (UE), predicted mobility information that indicates a predicted route of the UE and one or more cells associated with the predicted route, wherein the predicted mobility information indicates a confidence level for each of the one or more cells associated with the predicted route; and enabling a handover of the UE from the source base station to a target base station based at least in part on the predicted mobility information.

Aspect 16: The method of Aspect 15, wherein: the predicted mobility information is based at least in part on historical measurement reports generated by the UE; or the predicted mobility information is based at least in part on a current location of the UE and a destination of the UE.

Aspect 17: The method of any of Aspects 15 through 16, wherein: the predicted mobility information is based at least in part on a current location of the UE, a time of day, and historical movements of the UE; or the predicted mobility information is based at least in part on a current location of the UE and calendar information associated with a user of the UE.

Aspect 18: The method of any of Aspects 15 through 17, wherein enabling the handover of the UE further comprises: transmitting, to the UE, a configuration for a plurality of potential target base stations based at least in part on the predicted mobility information, wherein the configuration enables the handover to be triggered at the UE.

Aspect 19: The method of any of Aspects 15 through 18, further comprising: reserving resources for the UE to connect to the target base station based at least in part on the predicted mobility information.

Aspect 20: The method of any of Aspects 15 through 19, wherein enabling the handover of the UE further comprises: triggering the handover of the UE to the target base station based at least in part on the predicted mobility information.

Aspect 21: The method of any of Aspects 15 through 20, wherein the predicted mobility information is derived based at least in part on a machine learning model, wherein the machine learning model is based at least in part on one or more UE-specific parameters including a receiver sensitivity for different bands, and UE-specific thresholds based at least in part on band combinations and a UE transmit power due to other active radios at the UE.

Aspect 22: The method of any of Aspects 15 through 21, further comprising: transmitting, to the UE, UE-specific measurement objects and corresponding thresholds for event reporting based at least in part on the predicted mobility information; receiving, from the UE, measurement reports based at least in part on the UE-specific measurement objects and the corresponding thresholds for event reporting; and triggering the handover of the UE based at least in part on the measurement reports.

Aspect 23: The method of any of Aspects 15 through 22, further comprising: disabling a configuration associated with neighbor base stations for the UE during a predicted mobility period based at least in part on the predicted mobility information.

Aspect 24: The method of any of Aspects 15 through 23, further comprising: transmitting, to the UE, a radio resource management configuration based at least in part on the predicted mobility information.

Aspect 25: An apparatus for wireless communication at a device, comprising a processor; memory coupled with the processor; and instructions stored in the memory and executable by the processor to cause the apparatus to perform the method of one or more Aspects of Aspects 1-14.

Aspect 26: A device for wireless communication, comprising a memory and one or more processors coupled to the memory, the memory and the one or more processors configured to perform the method of one or more Aspects of Aspects 1-14.

Aspect 27: An apparatus for wireless communication, comprising at least one means for performing the method of one or more Aspects of Aspects 1-14.

Aspect 28: A non-transitory computer-readable medium storing code for wireless communication, the code comprising instructions executable by a processor to perform the method of one or more Aspects of Aspects 1-14.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 30: An apparatus for wireless communication at a device, comprising a processor; memory coupled with the processor; and instructions stored in the memory and executable by the processor to cause the apparatus to perform the method of one or more Aspects of Aspects 15-24.

Aspect 31: A device for wireless communication, comprising a memory and one or more processors coupled to the memory, the memory and the one or more processors configured to perform the method of one or more Aspects of Aspects 15-24.

Aspect 32: An apparatus for wireless communication, comprising at least one means for performing the method of one or more Aspects of Aspects 15-24.

Aspect 33: A non-transitory computer-readable medium storing code for wireless communication, the code comprising instructions executable by a processor to perform the method of one or more Aspects of Aspects 15-24.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 15-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
determine predicted mobility information associated with the UE that indicates a predicted route of the UE and one or more cells associated with the predicted route, wherein the predicted mobility information indicates a confidence level for each of the one or more cells associated with the predicted route;
transmit the predicted mobility information to a source base station;
receive a radio resource management (RRM) configuration, wherein the RRM configuration indicates a frequency at which the UE performs measurements, wherein the frequency at which the UE performs the measurements is based at least in part on the predicted mobility information and historical measurement reports associated with the predicted route;
transmit measurement reports to the source base station based at least in part on the RRM configuration; and
perform a handover of the UE from the source base station to a target base station based at least in part on the measurement reports.

2. The UE of claim 1, wherein the memory and the one or more processors, when determining the predicted mobility information, are configured to determine the predicted mobility information based at least in part on historical measurement reports generated by the UE.

3. The UE of claim 1, wherein the confidence level indicates a likelihood that a given cell will be traversed by the UE.

4. The UE of claim 1, wherein the memory and the one or more processors, when determining the predicted mobility information, are configured to determine the predicted mobility information based at least in part on a current location of the UE and a destination of the UE, wherein the destination is indicated in a navigation application associated with the UE.

5. The UE of claim 1, wherein the memory and the one or more processors, when determining the predicted mobility information, are configured to determine the predicted mobility information based at least in part on a current location of the UE, a time of day, and historical movements of the UE.

6. The UE of claim 1, wherein the memory and the one or more processors, when determining the predicted mobility information, are configured to determine the predicted mobility information based at least in part on a current location of the UE and calendar information associated with a user of the UE.

7. The UE of claim 1, wherein the memory and the one or more processors are further configured to:
receive, from the source base station, a configuration for a plurality of potential target base stations based at least in part on the predicted mobility information; and
trigger the handover of the UE to the target base station indicated in the configuration for the plurality of potential target base stations, and wherein the target base station is associated with reserved resources for the UE based at least in part on the predicted mobility information.

8. The UE of claim 1, wherein the memory and the one or more processors, when performing the handover, are configured to perform the handover based at least in part on a handover triggering at the source base station based at least in part on the predicted mobility information.

9. The UE of claim 1, wherein the memory and the one or more processors, when determining the predicted mobility information, are configured to determine the predicted mobility information based at least in part on a machine learning model that is deployed at the UE.

10. The UE of claim 9, wherein the machine learning model is based at least in part on one or more UE-specific parameters including a receiver sensitivity for different bands, and UE-specific thresholds based at least in part on band combinations and a UE transmit power due to other active radios at the UE.

11. The UE of claim 1, wherein the handover of the UE is triggered at the source base station based at least in part on the measurement reports.

12. The UE of claim 1, wherein the memory and the one or more processors are further configured to:
disable measurement capturing during a predicted mobility period based at least in part on the predicted mobility information.

13. The UE of claim 1, wherein the memory and the one or more processors are further configured to:
determine candidate radio access technologies (RATs) or cells and associated confidence factors and configurations based at least in part on the predicted mobility information; and
determine a dedicated data subscription based at least in part on a data throughput associated with the candidate RATs or cells and associated confidence factors and configurations.

14. A source base station for wireless communication, comprising:
a memory; and
one or more processors coupled to the memory, the one or more processors configured to:
receive, from a user equipment (UE), predicted mobility information that indicates a predicted route of the UE and one or more cells associated with the predicted route, wherein the predicted mobility information indicates a confidence level for each of the one or more cells associated with the predicted route;
transmit a radio resource management (RRM) configuration, wherein the RRM configuration indicates a frequency at which the UE performs measurements, wherein the frequency at which the UE performs the measurements is based at least in part on the predicted mobility information and historical measurement reports associated with the predicted route;
receive measurement reports from the UE based at least in part on the RRM configuration; and
enable a handover of the UE from the source base station to a target base station based at least in part on the measurement reports.

15. The source base station of claim 14, wherein:
the predicted mobility information is based at least in part on historical measurement reports generated by the UE; or
the predicted mobility information is based at least in part on a current location of the UE and a destination of the UE.

16. The source base station of claim 14, wherein:
the predicted mobility information is based at least in part on a current location of the UE, a time of day, and historical movements of the UE; or
the predicted mobility information is based at least in part on a current location of the UE and calendar information associated with a user of the UE.

17. The source base station of claim 14, wherein the memory and the one or more processors, when enabling the handover of the UE, are further configured to:
transmit, to the UE, a configuration for a plurality of potential target base stations based at least in part on the predicted mobility information, wherein the configuration enables the handover to be triggered at the UE.

18. The source base station of claim 14, wherein the memory and the one or more processors are further configured to:
reserve resources for the UE to connect to the target base station based at least in part on the predicted mobility information.

19. The source base station of claim 14, wherein the memory and the one or more processors, when enabling the handover of the UE, are further configured to:
trigger the handover of the UE to the target base station based at least in part on the predicted mobility information.

20. The source base station of claim 14, wherein the predicted mobility information is derived based at least in part on a machine learning model, wherein the machine learning model is based at least in part on one or more UE-specific parameters including a receiver sensitivity for different bands, and UE-specific thresholds based at least in part on band combinations and a UE transmit power due to other active radios at the UE.

21. The source base station of claim 14, wherein the memory and the one or more processors are further configured to:
trigger the handover of the UE based at least in part on the measurement reports.

22. The source base station of claim 14, wherein the memory and the one or more processors are further configured to:
disable a configuration associated with neighbor base stations for the UE during a predicted mobility period based at least in part on the predicted mobility information.

23. A method of wireless communication performed by a user equipment (UE), comprising:
determining predicted mobility information associated with the UE that indicates a predicted route of the UE and one or more cells associated with the predicted route, wherein the predicted mobility information indicates a confidence level for each of the one or more cells associated with the predicted route;

transmitting the predicted mobility information to a source base station;

receiving a radio resource management (RRM) configuration, wherein the RRM configuration indicates a frequency at which the UE performs measurements, wherein the frequency at which the UE performs the measurements is based at least in part on the predicted mobility information and historical measurement reports associated with the predicted route;

transmitting measurement reports to the source base station based at least in part on the RRM configuration; and performing a handover of the UE from the source base station to a target base station based at least in part on the measurement reports.

24. The method of claim 23, further comprising:
receiving, from the source base station, a configuration for a plurality of potential target base stations based at least in part on the predicted mobility information; and
triggering the handover of the UE to the target base station indicated in the configuration for the plurality of potential target base stations, wherein the target base station is associated with reserved resources for the UE based at least in part on the predicted mobility information.

25. The method of claim 23, wherein performing the handover comprises performing the handover based at least in part on a handover triggering at the source base station based at least in part on the predicted mobility information.

26. The method of claim 23, further comprising:
disabling measurement capturing during a predicted mobility period based at least in part on the predicted mobility information.

27. A method of wireless communication performed by a source base station, comprising:
receiving, from a user equipment (UE), predicted mobility information that indicates a predicted route of the UE and one or more cells associated with the predicted route, wherein the predicted mobility information indicates a confidence level for each of the one or more cells associated with the predicted route;

transmitting a radio resource management (RRM) configuration to the UE, wherein the RRM configuration indicates a frequency at which the UE performs measurements, wherein the frequency at which the UE performs the measurements is based at least in part on the predicted mobility information and historical measurement reports associated with the predicted route;

receiving measurement reports from the UE based at least in part on the RRM configuration; and enabling a handover of the UE from the source base station to a target base station based at least in part on the measurement reports.

28. The method of claim 27, wherein:
the predicted mobility information is based at least in part on historical measurement reports generated by the UE;
the predicted mobility information is based at least in part on a current location of the UE and a destination of the UE;
the predicted mobility information is based at least in part on a current location of the UE, a time of day, and historical movements of the UE; or
the predicted mobility information is based at least in part on a current location of the UE and calendar information associated with a user of the UE.

29. The method of claim 27, wherein enabling the handover of the UE comprises:
transmitting, to the UE, a configuration for a plurality of potential target base stations based at least in part on the predicted mobility information, wherein the configuration enables the handover to be triggered at the UE; or
triggering the handover of the UE to the target base station based at least in part on the predicted mobility information.

30. The method of claim 27, further comprising:
reserving resources associated with the UE connecting to the target base station based at least in part on the predicted mobility information.

* * * * *